United States Patent [19]

Dupre

[11] 3,822,825
[45] July 9, 1974

[54] SNOW MAKING APPARATUS AND SYSTEM

[76] Inventor: Herman K. Dupre, c/o Seven Springs, Champion, Pa. 15622

[22] Filed: Aug. 8, 1973

[21] Appl. No.: 386,528

[52] U.S. Cl. .................... 239/14, 239/423, 239/543
[51] Int. Cl. .......................................... F25c 3/04
[58] Field of Search ............. 239/2.5, 14, 280, 276, 239/423, 426, 430, 543

[56] References Cited
UNITED STATES PATENTS

| 1,051,672 | 1/1913 | Boudreaux | 239/543 X |
| 2,049,940 | 8/1936 | Barthel | 239/423 X |
| 3,408,005 | 10/1968 | Struble et al. | 239/2.5 UX |
| 3,706,414 | 12/1973 | Dupre | 239/2.5 X |
| 3,761,020 | 9/1973 | Tropeano et al. | 239/2.5 |

Primary Examiner—M. Henson Wood, Jr.
Assistant Examiner—John J. Love
Attorney, Agent, or Firm—Carothers and Carothers

[57] ABSTRACT

Apparatus and system for making snow in particular for ski slopes in the colder months of the year, wherein there is provided a plurality of vertically extended snow making towers for supplying water and air to a plurality of discharge outlets at the upper or top end of each tower. The main conduit of the tower is for supplying water to the water discharge nozzle outlets adjacent the top of the tower while an air conduit provided for the full length of and within the water conduit provides for the discharge of air above the nozzle outlets, the discharged air being directed into the throat of the discharged water spray.

12 Claims, 3 Drawing Figures

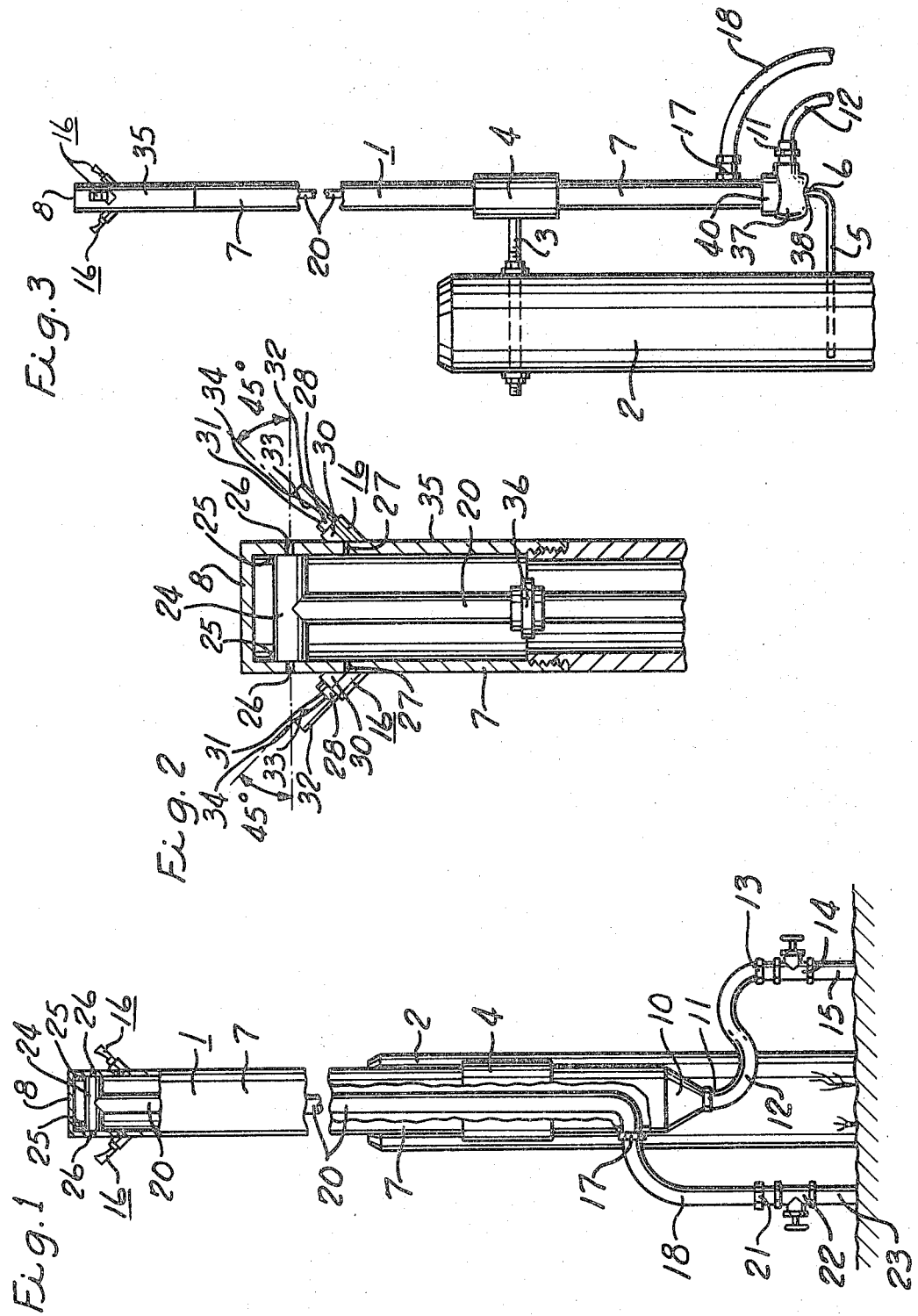

SNOW MAKING APPARATUS AND SYSTEM

BACKGROUND OF THE INVENTION

This invention relates generally to fluid sprinkling and more particularly to weather control spraying. The invention herein disclosed is an improvement over my U.S. Pat. No. 3,706,414 dated Dec. 19, 1972.

Numerous systems have been developed for artificially producing snow wherein water and air under pressure are in some manner mixed and commingled. The principle involved is to reduce the size of water particles to the barest minimum possible, albeit by injection of compressed air directly or indirectly with the water or mixing with air using deflectors and baffles within a mixing chamber.

Artificial snow is formed from seed crystals. These seed crystals are formed from the expansion of air expelled into the atmosphere around which minute water particles freeze and form snow. The air, being compressed, is at a higher temperature than normal ambient winder conditions and when expelled will expand to atmospheric pressure while reducing a great deal in temperature. Because of the pressure reduction, the high level of moisture present in the compressed air upon expansion will condense, immediately forming the seed crystals necessary for snow. These seed crystals are immediately formed because of the extremely low temperature condition obtained thorugh the expansion of the air together with freezing atmospheric conditions of winter, that is, temperatures below 32°F. The seed crystal thus formed can be combined with atomized water in a manner to form more snow.

In connection with the atomizing of water, the water particle size should be as small as possible, because if they are too large, depending on ambient weather conditions and the ratio of water to air mixture, they will produce ice or sleet particles which are unsatisfactory for desirable skiing conditions. Also, the greater the water pressure at the discharge nozzle, the smaller the water particles or moisture droplets upon nozzle discharge.

Examples of the jet pump principle in air and water mixing devices for producing artificial snow are shown in U.S. Pat. Nos. 3,464,625 and 3,494,559, wherein a water-air nozzle is provided so that the compressed air is introduced in an area immediately behind a centrally located water jet nozzle. The sheath of air around the water jet causes atomization of the water as it expands from the nozzle into the atmosphere.

Other types of snow making apparatus provide for the water and compressed air to be mixed together in a chamber prior to discharge from the nozzle into the atmosphere. Baffles or deflectors may be employed to aid in the mixing process in order to atomize and reduce the water into small, minute particles of water acceptable for seed crystal formation upon discharge from the nozzle. Examples of these are found in U.S. Pat. Nos. 3,010,660; 3,298,612 and 3,301,485, as well as my own U.S. Pat. No. 3,706,414. The commingling of compressed air and water in the manner taught in these patents for the most part has been the most successful means for producing artificial snow. In particular, U.S. Pat. No. 3,706,414 provides for a snow making system utilizing high snow towers having discharge nozzles at the top of the tower. Pressurized air and water are introduced at the bottom of each tower of the system where they are commingled to reduce the water into fine water particles which are discharged from the top of the tower approximately 35 feet above the ground and produce the seed crystals necessary to produce snow. The advantage obtained from this system is that due to the tower height, a characteristically long dwell time can be obtained, that is, the time between the time the seed crystals are formed upon discharge and the time the snow crystals, as formed from the seed crystals, finally settle upon the ground. This lengthy dwell time provides for sure and sufficient seed crystal formation of the atomized discharge as well as complete formation of good snow crystals upon settling to the ground. Also, this system of high snow towers does not interfere with recreational use of the ski slope, as skiers can use the slope while the snow making process is in progress. Further, a larger area of snow coverage can be effectively obtained.

Another advantage is costs, in that once this system is installed, no further costs will be incurred as the life of the system is as long as the life of the pipe employed in the system. Further, other systems require that portable snow making units be moved about the ski slope, such as shown in U.S. Pat. Nos. 3,298,612 and 3,010,660, which requires additional personnel and sometimes the aid of vehicular means to move these units from one location to another. During this procedure, it is quite difficult to have skiers continue to use the slope.

However, there are still certain advantages in this systems as well as other systems mentioned in the area of controlling the air and water output on a continuous basis in obtaining the optimum air to water ratio. As ambient weather conditions change, particularly temperature and humidity, the proportional ratio of air and water will change. An operator can be employed to go from snow tower to snow tower making adjustments to the air to water ratio by operating the respective valves in the air and water lines to the tower to control the volume of air and water being mixed and commingled. However, the operator has no means by which to determine if he has obtained an optimum air to water ratio. As a consequence, the operator usually adds more water or air to be commingled in the tower. In many cases, ice or sleet-like particles may be formed even though the operator has attemped to obtain a desired ratio condition on a trial and error basis.

The attempt to obtain an optimum air to water ratio is further frustrated by pressure balancing. If the air and water entering the lower end of the tower are not at the same pressure, then the fluid medium having the higher pressure value will enter into the conduit or line of the lower pressure fluid medium. For example, assume that the minimum water pressure needed at ground level of the snow tower which is at the highest point on the mountain is 100 lbs. If the air compressor utilized has a capacity of 100 lbs. pressure, one must maintain 100 lbs. water pressure at the highest tower on the slope, assuming no frictional losses, to insure proper pressure balancing between water and air pressure. Actual tests have shown, however, that the maximum effective air pressure discharge from this highest tower at the lower nozzle 35 feet above the ground is approximately 70 lbs., and at its ground level is 95 lbs. The water pressure at the discharge nozzle should also be 70 lbs. Actual testing has shown that with 70 lbs. water pressure at the tower nozzle, there waa an 85 lb.

water pressure at the bottom of the highest tower. Thus, we are faced with a 30 lb. efficiency loss in air pressure and a 15 lb. efficiency loss in water pressure where the system pumping equipment is capable of respectively producing 100 lbs. pressure of water and air pressure.

In the above-mentioned testing, the snow making system employed is installed upon a ski slope having a 400 ft. vertical drop. By calculation, it has been found that in view of the fact that the water supplied is pumped from a water source from the top of the ski slope, the actual water pressure provided to the lower snow making tower at the bottom of the slope is approximately 172 additional pounds, rather than just 100 lbs., so that the total water pressure at this lowest tower is approximately 272 lbs. Since the maximum air pressure obtainable at the tower nozzle is 70 lbs., it is quite obvious that this additional 172 pounds of water pressure is lost and of no use because it is not needed when pressure balancing the air and water supplied to this snow tower.

From all of the foregoing, it can be readily seen that with a plurality of snow towers positioned up and down a ski slope adjacent to a ski trail, by necessity, due to differences in air and water pressures and volumes, one must attempt to regulate each tower to balance air and water pressures while also attempting to obtain optimum air to water ratios for each tower. This is practically next to impossible, because the adjustment of pressure and volume of one fluid medium seems to always cause the necessity of adjustment of the other fluid medium. Further, since the pressure value of the water differs from tower to towar all the way up the slope, the adjustment of the pressure of the entire system is limited by the tower having the lowest pressure point of water, so that the full capacity of water and air pressure that can be developed in the system cannot be efficiently utilized.

There is no question that the most expensive component in any practical snow making system is the cost of the compressed air, which represents about 90 percent of the costs of consummables in the making of snow. In particular, compressor equipment necessary for an entire ski slope is very expensive to purchase, and is usually obtained on a rental basis. Even in the face of these air compressor costs, it can be readily seen from the foregoing that these costs are further augmented by the efficiency loss of air pressure delivered to the system and discharged at the snow tower nozzles.

If these efficiency losses could be reduced in combination with a reduction of the amount of air pressure needed at the discharge nozzle, cost and operational expense of compressor and pump equipment can be substantially reduced while utilizing the pumping equipment of the snow making system at optimum efficiency levels. Air compressor costs cannot be eliminated, as compressed air is needed because of the ability of air upon expansion to provide for seed crystals. But these costs can at least be reduced through the optimum employment of equipment and the reduction of compressed air needed in snow making.

Another disadvantage in prior art snow making devices and systems is air line freeze-up. Compressed air contains considerable moisture and where freezing ambient conditions exist, the air line, particularly above the surface and at the point of conduit connection to the snow tower mixing chamber, will often freeze-up, where ambient temperatures are 20°F or less. The moisture in the compressed air at this point in the conduit of the system will freeze into ice and over a period of time will freeze to a point where the conduit cross section will be completely closed off due to ice formation preventing the compressed air from reaching the tower mixing chamber. As an example, under operating conditions presently existing at Seven Springs, the water temperature entering the bottom of the snow tower is approximately 39°F, and the air temperature is approximately 80°F. However, the 80°F air temperature will reduce below freezing relatively quickly when the compressed air is traveling through the conduit exposed to the freezing ambient atmosphere and expanding into the mixing chamber in the snow tower as compared to the water at 39°F entering the same mixing chamber. It is this principle itself that quickly cools the water through the vertical length of the snow tower which is being continuously broken down or atomized by the compressed air.

This problem has also plagued the snow making devices of the past. For example, U.S. Pat. No. 3,298,612 employs a metal jacket around the mixing chamber which is not effective, particularly at lower sub-freezing temperatures and in particular does not solve the problem of air line freeze-up in the conduit leading to the snow making device.

Also, the bleeder line shown in this patent will freeze up due to the moisture in the compressed air dissipating out due to surrounding freezing temperatures. Further, due to the nozzle configuration outside the snow making device, snow and ice will build up to a point necessitating manual removal.

This particular problem was eliminated by my U.S. Pat. No. 3,706,414. In that system, I have eliminated this problem by having very short air lines between the bottom of the snow making apparatus and the air supply lines below the ground freeze line. These short air lines exposed to the freezing atmospheric conditions are usually no more than five feet in length, making it impossible to cool the compressed air within these lines from the temperature of 85°F to 32°F.

This same problem may be eliminated in other systems by having an operator reverse these lines on the average of at least once an hour to eliminate possible freeze-up in the air line. The elimination of such operational functions, such as air and water line reversing at each tower and checking and adjusting the air to water ratio at each tower would further eliminate operational costs in the snow making system.

SUMMARY OF INVENTION

The principal object of this invention is an improved snow making apparatus and system wherein optimum snow making conditions are readily obtained at each snow making tower positioned along the ski slope regardless of its elevation along the slope. The apparatus comprising this invention eliminates the necessity of air and water pressure balancing and permits maximum possible water pressure to be used at each individual snow tower. The greater the water pressure, the better the atomization of the water into fine particles of water. Consequently, less compressed air need be utilized in the snow making process.

Another object of the present invention is the elimination of the necessity to have an operator periodically adjust each inividual tower to obtain optimum air to water ratios for proper discharge to obtain the best snow conditions. Under the system of the present invention, optimum ratios can be readily achieved upon initial operation of each snow tower. Also, the necessity of employing an operator to periodically reverse the conduit lines to each tower to prevent air line freeze-up is eliminated.

Another object of the present invention is the reduction of the amount of compressed air necessary in the snow making operation, thereby reducing the operation expense, in particular, that element in the snow making operation which is the most expensive. The improvement accomplishes this by not mixing the air directly with the water in the tower mixing chamber or within the tower per se, but rather applying all compressed air to water fog produced at the water discharge nozzle at the top of the tower. The discharged air is directed to the throat of the water fog produced by the water nozzle.

Another object of the present invention is the provision of the air supply line in each tower being placed within the water conduit so as to insulate the air from the freezing ambient atmosphere outside the water conduit. The water, at a temperature above freezing, usually about 39°F, will surround the air line so that the air line is protected from freezing until the air reaches its point of discharge at the top of the tower where it is discharged through an orifice into the atmosphere expanding and condensing the moisture due to subfreezing temperatures into seed crystals as well as being applied directly against the throat of the water fog produced by the water nozzle.

Another object of the present invention is the provision of an aperture in the wall of the water conduit to which the air line is connected, providing an air discharge orifice. Since this discharge orifice will be flush with the water conduit wall, no ice build up around the area of the air orifice will be experienced.

I have found that by providing a compressed air nozzle adjacent and above a water atomizing nozzle at the top of the snow tower, better snow making conditions can be obtained for two principal reasons. First, the compressed air, upon being expelled from the air nozzle into the atmosphere, is greatly reduced in temperature causing it to give up its moisture in the form of seed crystals. These seed crystals form almost instantaneously. The air nozzle is positioned in a manner to be directed into the throat of the water fog produced by the water nozzle to bombard the water particles, which in many cases are as small as 200 microns or less, thereby uniting with these water particles to make snow particles or produce more seed crystals necessary in making snow. It should be understood that in order to make artificial snow, the tiny atomized water particles need something to unite with other than falling through the ambient atmosphere. This is because of the surface tension of these minute water particles. Upon contact with one or more seed crystals, however, the surface tension of the water particle is broken and the unification of the seed crystal or crystals with the water particle will produce a multitude of snow flakes. This process continually occurs as the seed crystals and water particles intermingle and fall to the ground. In this connection, it is important to provide for optimum conditions, which is governed by the best atomized spray possible to produce the smallest water particles as possible upon discharge, while not sacrificing the maximum distance or throw of discharge from the snow tower. Thus, optimum area of snow coverage is obtained, as well as maximum dwell time in which the seed crystals and tiny atomized water particles may completely commingle and unite to form snow prior to reaching the ground.

Secondly, the expanding air from the air nozzle will shred the atomized water particles into smaller and finer particles or droplets. This will permit the unification of many times more seed crystals with water particles to form snow.

In summary, the compressed air performs these functions as applied in the present invention: upon expansion 1. it shreds the atomized water particles from the spray nozzle into finer water particles;
2. it implants seed crystals in the atomized water spray or fog; and
3. it cools the entire discharge zone to an extremely cold condition highly desirable for snow making. This temperature at discharge has been known to be as low as minus 100°F.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 illustrates the snow making apparatus comprising this invention.

FIG. 2 is a close-up, cross-sectional view of the top portion or area of the apparatus of FIG. 1.

FIG. 3 is a modified form of the apparatus shown in FIG. 1.

DETAILED DESCRIPTION OF THE PREFERRED EMBODIMENT

Reference is now made to FIG. 1 wherein there is shown the snow making apparatus comprising this invention. The apparatus shown is one of a plurality of snow making towers 1 which are positioned along a ski slope adjacent to a ski trail as illustrated in my U.S. Pat. No. 3,706,414.

As shown in FIGS. 1 and 3, the snow making tower 1 is supported from support means which consist of a standard 2 usually in the form of a wood support post anchored in the ground. Bolt member 3 is secured through the post and is provided with the sleeve member 4 through which the snow making tower 1 can be inserted and supported. Sleeve member 4 can be used as a means for detachably securing the snow tower 1 in position, or as shown in FIG. 3, the pin 5 can be provided at the lower end of the standard 2 having an upwardly extending ed 6 on which the snow tower 1 is supported. This arrangement permits rotational movement of the tower 1 within the sleeve 4 and selectively varying the directional output provided by the discharge nozzle at the top of the tower 1.

Again, referring to FIG. 1, the snow making tower 1 consists of an enlarged water conduit 7 which is closed at its upper end by means of the cap or end plate 8. The lower end of the conduit 7 is provided with a conical section member 10 which is the inlet for water into the water conduit 7. The coupling 11 secures to the conical section member 10 the water connecting conduit 12, which by means of the coupling 13 is connected to the water control valve 14 and main supply conduit 15. The entire outer walls and surface of the water conduit 7 are completely smooth having no projections or extensions other than the water discharge nozzles 16, which will be referred to more specifically below.

An opening is provided in the lower end of the water conduit 7 and by means of the coupling 17 the air connecting conduit 18 is connected to the internally mounted air supply conduit 20 maintained substantially centrally within the water tower 7. The air connecting conduit 18 is secured by means of the coupling 21 to the air control valve 22 and the main air supply conduit 23. The water supply conduit 15 and air supply conduit 23 are respectively connected to a water and air supply, and are substantially maintained for their full length completely underground below the frost line as illustrated in my U.S. Pat. No. 3,706,414.

The upper end of the air supply conduit 20 is provided with a Tee section 24 with the ends of the Tee section being secured to the inner walls of the water supply conduit 7 at 25 through the means of welding or the like. Air discharge orifices 26 are provided in the walls of the water supply conduit 7 at the point where the ends of Tee section 24 are attached. This is best shown in FIG. 2 wherein the water fog nozzles 16 are secured to the water supply conduit 7 in an angular position substantially at 45° and each of the nozzles 16 is provided with a connecting or communicating aperture 27 between the interior of the water supply conduit 7 and the spray nozzles 16.

It should be understood that the top of any tower 1 may be provided with two or more spray nozzles 16 in combination with air discharge orifices 26 as long as the water nozzles 16 are provided equiangularly around the side or cylindrical wall of the water supply conduit 7. In FIG. 1, two such nozzles are shown, whereas in FIG. 3, a combination of four such nozzles are illustrated. Three nozzles can be provided, as long as they are placed in equiangular positions around the outside of the water supply conduit 7.

Nozzles 16 are provided to be substantially at a 45° angle as indicated in FIG. 2, as this provides for optimum spreading or dispersing of water as well as projection of the water outwardly from the snow tower 1 thereby obtaining optimum dwell time, thereby permitting adequate formation of seed crystals and sufficient time for the conglomeration in formation of snow crystals prior to settling on the ground. As shown in FIG. 2, each of the nozzles 16 is provided with a body section 28 which is threaded into a support section 30 secured to the side wall of the water supply conduit 7. The nozzle body 28 is provided with a flat wall section 31 wherein there is provided the discharge orifice of the spray nozzle 16. The forward extension 32 of the spray nozzle 16 is provided with a spoon-shaped deflector surface 33. In general, the features of the spray nozzle 16 are covered in U.S. Pat. No. 2,530,671. The spoon-shaped deflector surface 33 provides for a very uniform and accurate spray pattern which is V-shaped and flat in distribution with minimum deflection and minimum loss in discharge velocity. These are highly desirable features in a water spray nozzle. This spray pattern is essentially formed from the lip 34 of the forward extension 32 and the V-shaped formation of the spray pattern at this point defines the throat of the spray pattern. It is at this area or vicinity that the compressed air stream discharged from the air discharge orifice 26 between the upper end 8 of the water supply conduit 7 and the water spray nozzle 16 should be directed. This intensified jet stream of air not only further aids in breaking up and dispersing the fanned out atomized water particles into smaller water droplets or particles, measurable in microns, but also brings about better conditions for the formation of seed crystals necessary in the snow making operation with a minimum amount of compressed air actually supplied to the air discharge orifices 26.

It should be noted that the air discharge orifices 26 are merely a drilled opening provided in the wall of the water supply conduit 7 so that there is no possibility or chance of ice building up around the vicinity of the orifice. Such ice build up around discharge orifices on snow making towers can be quite a problem, as from practical experience, if smooth adjoining surfaces are not provided on the body of the tower per se, particularly at the upper end, ice formations of 100 lbs. or more can readily form, the weight of which will overburden the supported tower and bring about its eventual destruction.

As illustrated in FIGS. 2 and 3, the upper portion of the tower 1 may be a separate structure identified at 35, which is threadably secured to the water supply conduit 7 as illustrated. The air supply conduit 20 may be provided with some type of coupling means illustrated at 36 for internal connection of this supply conduit between its upper and lower sections.

This modified structure shown in FIG. 3 in essence is quite similar to that shown in FIG. 1, except the elbow pipe section 37 is provided at the lower end of the tower and has an inner upward detent 38 which is supported on the end 6 of pin 5. The elbow section 37 is secured to the water supply conduit 7 at 40.

From the foregoing description of the snow making apparatus compising this invention, it can be readily seen that by placing the air supply conduit 20 within the water supply conduit 7, the air supply conduit is at all times surrounded by a continuous supply of water. This insulates the air supply from sub-freezing temperatures until the air is discharged through the air discharge orifice 26. The tower 1 in essence acts like a heat exchanger. The compressed air proceeding upward through the central air supply conduit is insulated from the outside freezing conditions so that the temperature is not reduced to freezing or below freezing temperatures, even with snow towers having lengths of 35 feet. The water moving up the water supply conduit does act as a heat transfer medium, and cools the air down to a point above freezing, depending upon the water temperature. But with delivery of the air with the water conduit, this assures against freezing of any formed condensate within the air supply conduit, which, if formed, is forced upwardly and out through the air nozzle. The water rising up within the water supply conduit which is an enlarged conduit, permits the water to be turbulently passed upward through the conduit and out through discharge spray nozzle 16. The general length of these snow making towers 1 is approximately 35 feet, which is a sufficiently long distance to reduce the temperature of the water from its above-freezing temperature to a temperature very close to freezing, so that upon discharge of the water through the spray nozzle 16, an atomized water spray or fog at this point of discharge is produced. Since the air supply is not provided in a mixing chamber at the lower end of the tower, the optimum water pressure can be used. With the greater water pressure being provided, smaller water particles will be produced on discharge, particularly when using the spoon-shaped type spray nozzle 16.

With the water flowing upwardly through the water supply conduit 7 and surrounding the air supply conduit 20, there is no chance during the heat exchange process between the air supply conduit via the water supply conduit 7 of having the temperature of the air drop below freezing until it reaches the point of discharge in the air discharge orifice 26 under normal freezing ambient temperature conditions. Thus, there is never any air line freeze-up nor necessity to reverse the air and water lines necessary in the prior art such as in U.S. Pat. No. 3,298,612.

Explanation will now be made of the benefits obtained when presenting the compressed air on the stream of snow fog at the water spray nozzle rather than providing for mixing with watr at the base of the snow tower 1. Under the system and apparatus of my U.S. Pat. No. 3,706,414, on the average for all towers a 5:1 air to water ratio can be maintained where temperatures are about 20°F. On the average, the volume of water can be 10 gallons per minute, which at this temperature level is mixed with 50 cubic feet per minute of air. At best, this ratio can be less, particularly in colder temperatures. But what happens is that if proper seed crystal growth is not achieved, one naturally adds more air to the tower or less water so that ther may be 5 gallons of water per minute and 100 cubic feet of air per minute, or an air water ratio of 20:1. This disproportionate ratio is not necessary and represents an unnecessary exhaust of compressed air, and the matter is further aggravated by the inability to employ full water pressure that is presently available at all snow towers.

Employing the apparatus of the present invention, the snow making system is naturally self-balancing using the optimum air and water pressure and volume capabilities. For example, a tower located at the bottom of the slope may have a capable water pressure delivery of 375 lbs. to the tower so that 10 gallons per minute can be expelled from the tower spray nozzles. Due to the optimum use of water pressure of 375 lbs., only 35 cubic feet of air per minute need be supplied to air discharge orifices 26 because an increase in operational water pressure brings about improved atomization of the water, that is, a much greater number of minute water particles, particularly when employing the spoon-shaped spray nozzle 16. Thus, for this tower at the bottom of the slope, approximately one-half of the air volume per minute is needed to produce the desired snow conditions, because under the system employed in my U.S. Pat. No. 3,706,414, due to the need for pressure balancing, the optimum snow making conditions can be obtained with about 70 cubic feet of air per minute delivered to the bottom of the tower.

By the same token, if a tower high on the ski slope receives a capable water pressure delivery of 100 lbs., the tower delivery may then be only 5 gallons of water per minute, so that only 35 cubic feet of air is needed at the air discharge orifices to produce optimum desired snow conditions. Again, on an average, there is a considerable savings in the amount of compressed air needed to produce desirable snow making conditions.

From the foregoing, it can be readily seen that optimum pressure and volume or fluid flows can be utilized while substantially reducing the requirements of compressed air, which is the most expensive component in the snow making operation, when utilzing the snow making apparatus of the present invention.

I claim:

1. Snow making apparatus comprising an elongated hollow conduit mounted in vertical position from support means to form a snow making tower, discharge nozzle means provided adjacent the upper end of said conduit, a water supply line attached at the lower end of said conduit to supply water therewithin and discharge the same through said nozzle means, an air supply conduit within and for the full length of said water conduit, the lower end of said air conduit communicant externally of said watr conduit, an air supply line attached to said air conduit lower end, an air discharge orifice between the upper end of said water conduit and each of said discharge nozzle means and connected to the upper end of said air conduit, said discharge orifice and said nozzle means positioned in a manner so that the air discharged from said orifice is directed into the throat of the water fog produced by said nozzle means, said air conduit from said lower end to said upper end connected to said air orifice insulated from freezing conditions by the moving and circulating water in said water conduit thereby preventing freeze-up within said air conduit.

2. The snow making apparatus of claim 1 characterized in that said air orifice consists of an aperture proded within the wall of said water conduit thereby preventing ice build up around the area of the air orifice.

3. The snow making apparatus of claim 2 characterized in that said nozzle means are positioned angularly relative to the vertical length of said snow making tower to produce a water spray discharge at an angular degree within the area of 45° from horizontal, the air discharged from said air orifice directed into the throat of angularly discharged water spray.

4. The snow making apparatus of claim 1 characterized in that said nozzle means are spoon shaped to provide a diversified spray formed at the lip thereof.

5. The snow making apparatus of claim 1 characterized by a control valve in said water spply line and said air supply line, the majority of the length of said supply lines located below the frost line.

6. The snow making apparatus of claim 1 characterized by a metallic heat conducting medium comprising said water conduit.

7. The snow making apparatus of claim 1 characterized in that said snow making conduit is mounted on said support means to be rotatable about a vertically extending axis.

8. The snow making apparatus of claim 1 characterized in that the length of said towers is withln a range of 8 feet to 35 feet.

9. The snow making apparatus of claim 8 characterized in that the preferred length of said towers is in the area of 35 feet to obtain maximum dwell time while not sacrificing said tower to potential destruction by winds due to additional tower length.

10. A system for making snow comprising a plurality of elongated hollow conduits mounted in vertical position from support means to form an aligned series of snow making towers positioned along the length of a ski slope, discharge nozzle means provided adjacent the upper end of each of said conduits, a water supply line attached to the lower end of each of said conduits to supply water within said conduits and discharge the same through said nozzle means, an air supply conduit within and for the full length of each of said water supply conduits, the lower end of each of said air conduits communicant externally of their respective water conduits, an air supply line attached to each of said air conduit lower ends, air orifice means in each of said water conduits between the upper ends thereof and said nozzle means and connected integrally to the respective upper ends of said air supply conduits, said discharge orifice means and said nozzle means on each of said towers positioned in a manner so that the air discharged from said orifice means is directed into the throat of the water spray produced by said nozzle means, said air conduits from their said lower ends to their said upper ends connected integrally with said orifice means insulated from ambient freezing conditions by the moving and circulating water in said water conduits thereby preventing freeze-up within said air conduits.

11. In a snow making system, a snow making tower comprising an elongated hollow conduit mounted in vertical position from ground support means, discharge nozzle means provided adjacent the upper end of said conduit, means for supplying water to said conduit for discharge in the form of a spray from said nozzle means, an air conduit provided within and for the full length of said water conduit, means for supplying air to the lower end of said air conduit, air discharge means provided at the upper end of said air conduit in said water conduit between the upper end of said water conduit and said discharge nozzle means, said air discharge means and said discharge nozzle means positioned relative to each other to cause the discharged air to be directed into the throat of the discharged water spray.

12. The snow making tower of claim 11 characterized by control means in said water and air supply means to regulate and vary the amount of air and water discharged from said air discharge means and said discharge nozzle means, respectively.

* * * * *